United States Patent [19]
Halse et al.

[11] Patent Number: 5,452,941
[45] Date of Patent: Sep. 26, 1995

[54] FLAT SEAT BELT RETRACTOR

[75] Inventors: Larry E. Halse, Milford; Jeffrey A. Tilley, Canton, both of Mich.

[73] Assignee: Hoover University, Inc., Plymouth, Mich.

[21] Appl. No.: 277,335

[22] Filed: Jul. 19, 1994

[51] Int. Cl.[6] ............... A62B 35/00; B60R 22/00; B60R 22/30
[52] U.S. Cl. ............... 297/480; 297/483; 297/478; 297/452.2
[58] Field of Search ............... 297/483, 484, 297/480, 478, 452.18, 452.2; 280/808

[56] References Cited

U.S. PATENT DOCUMENTS

| | | | |
|---|---|---|---|
| 3,439,933 | 4/1969 | Jantzen . | |
| 3,638,999 | 2/1972 | Tischler | 297/480 |
| 3,667,805 | 6/1972 | Apri | 297/480 |
| 4,373,748 | 2/1983 | Reid et al. | 297/480 |
| 4,652,053 | 3/1987 | Mikami | 297/483 |

Primary Examiner—Kenneth J. Dorner
Assistant Examiner—Anthony Barfield
Attorney, Agent, or Firm—Harness, Dickey & Pierce

[57] ABSTRACT

A flat seat belt retractor in which the seat belt webbing is retracted into an elongated housing and stored in a flat condition as opposed to winding the webbing around a spool. By incorporating a flat webbing retractor into a vehicle seat back, the seat belt retractor can be packaged in a seat back without requiring enough space to store a bulky spool type retractor. In a preferred embodiment, the retractor is incorporated into a structural member of the seat back frame to reduce the overall number of components required in the seat back for both the frame and the retractor.

16 Claims, 3 Drawing Sheets

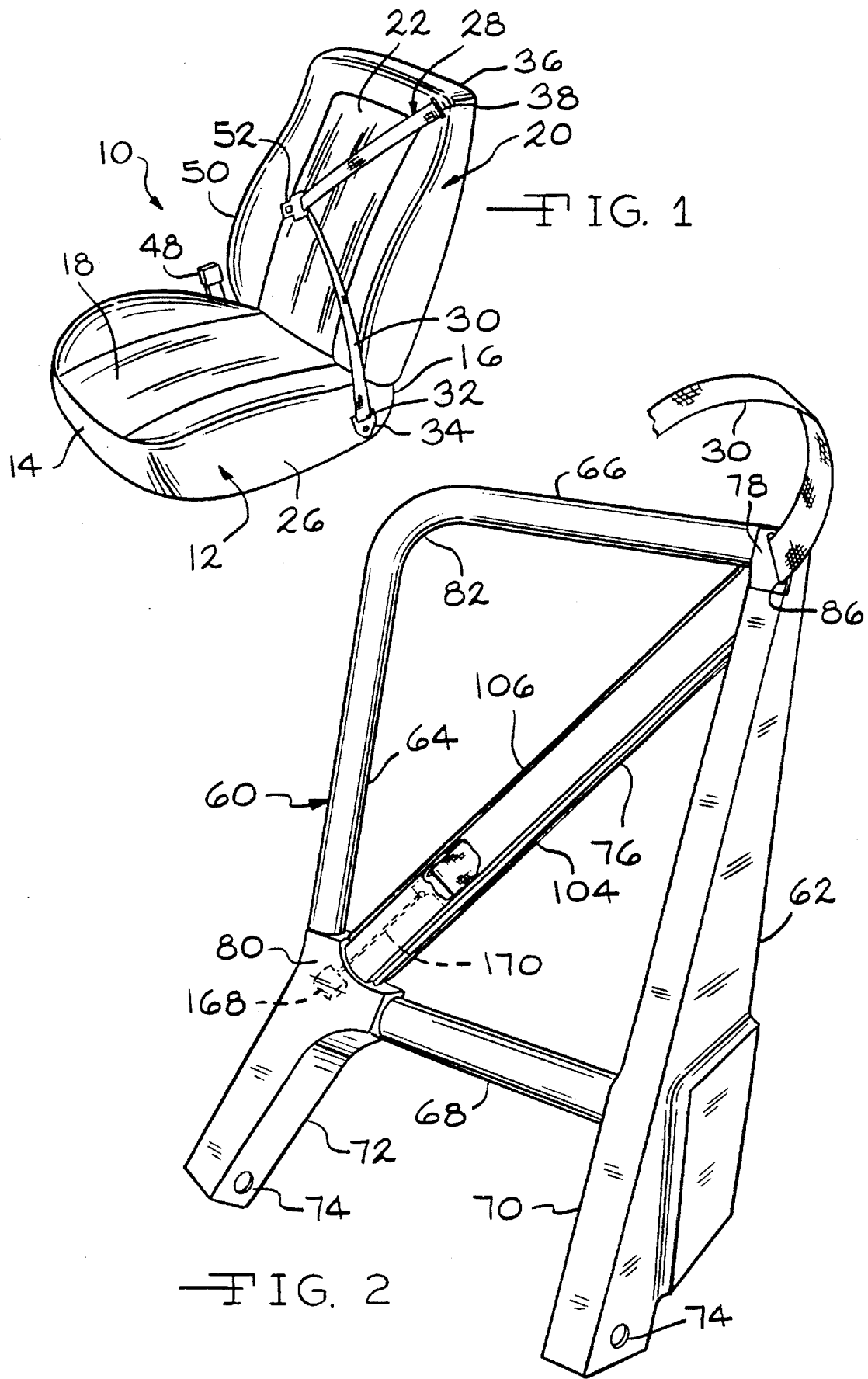

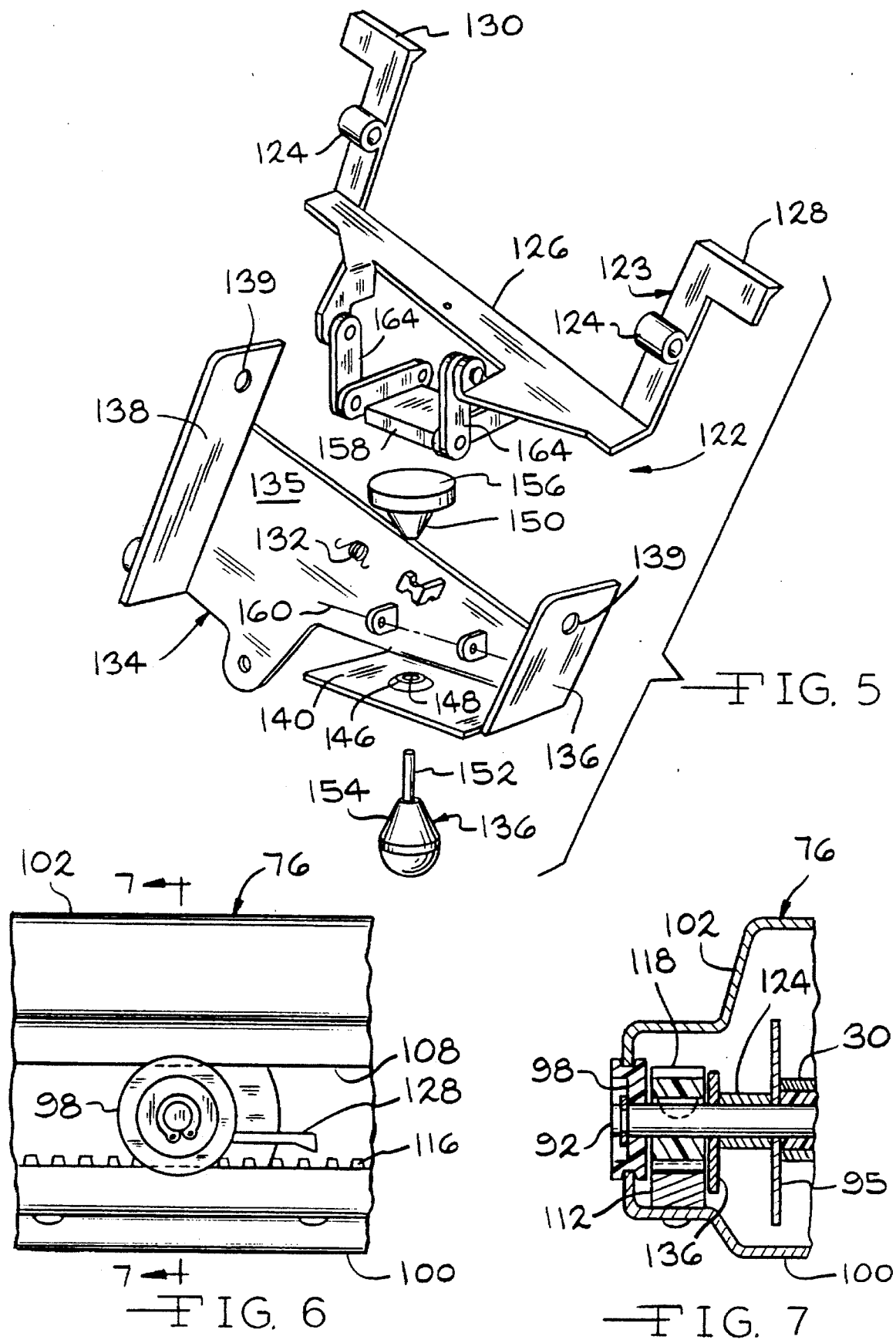

FLAT SEAT BELT RETRACTOR

BACKGROUND AND SUMMARY OF THE INVENTION

The present invention relates generally to seat belt retractors and in particular to a flat seat belt retractor incorporated into a seat back frame which retracts a portion of the belt webbing into the seat back frame for storage of the belt webbing.

Seat belts for motor vehicles typically include a belt webbing that is attached at one end to the vehicle structure and at the other end to a webbing retractor attached to the vehicle structure. A clasp slidably mounted on the webbing is insertable into a buckle after pulling a portion of the webbing from the retractor, forming a lap belt and a shoulder belt for a seat occupant. Commonly used seat belt webbing retractors wind the webbing around a rotating spool to retract the webbing into the retractor housing. To store a sufficient quantity of belt webbing for large seat occupants, it is necessary that the retractor housing be relatively large.

To improve both the comfort and performance of seat belt restraint systems, seats are being developed which have the belt restraint system mounted to the seat rather than to the vehicle body. This improves the comfort and performance of the restraint system by maintaining the belt anchor points in fixed positions relative to the seat occupant, regardless of the adjusted position of the seat within the vehicle body.

When a seat belt restraint system is mounted to a seat as opposed to being mounted directly to the vehicle structure adjacent to the seat, it is necessary for the retractor to be "packaged" or contained within the interior of the seat. Due to the large space required for a spool type retractor, it is often difficult to package such a retractor within a seat, either the seat cushion or the seat back.

Accordingly, it is an object of the present invention to provide a seat belt webbing retractor of a reduced thickness compared to a spool type retractor to facilitate the packaging of the retractor within a seat.

It is a feature of the present invention to provide an elongated housing with an opening into which the webbing is retracted by moving the webbing through the length of the housing. By attaching the webbing to a slide movable along the length of the housing, the webbing will be retracted into the housing as the slide moves away from the housing opening or the webbing will be protracted from the housing as the slide moves toward the opening. As a result, the webbing remains generally flat within the housing, rather than being wound on a spool and thus, the retractor is of a reduced thickness compared to a spool type retractor and therefore easier to package within a seat assembly.

It is a further feature of the present invention to incorporate the retractor housing into a structural frame member of the seat back. This results in a dual function for the frame member, reducing the number of separate components required in the seat back frame and retractor. In a preferred embodiment, the seat back frame includes a diagonal frame member extending from one upper corner of the seat back frame to an opposite lower corner with the seat belt webbing retractor being contained within the diagonal frame member. An opening at the upper corner of the seat back frame is used for the webbing to pass into and out of the seat back frame.

The retractor preferably includes an inertia latch mechanism to prevent protraction of the belt webbing in the event of a vehicle acceleration beyond a predetermined level. An inertia latch is provided by a locking pawl having a lever rotatable into engagement with the teeth of a gear rack along the path of travel of the retractor slide. When an acceleration of a predetermined value is experienced, the latch pawl will rotate to engage the lever with the teeth of the stationary rack, thus locking the slide in place and preventing movement of the slide toward the opening through which the belt webbing is protracted.

Further objects, features and advantages of the invention will become apparent from a consideration of the following description and the appended claims when taken in connection with the accompanying drawings.

BRIEF DESCRIPTION OF THE DRAWINGS

FIG. 1 is a perspective view of a seat containing the flat seat belt retractor of the present invention;

FIG. 2 is a perspective view of the seat back frame of the seat shown in FIG. 1 with a portion broken away showing the retractor;

FIG. 5 is an exploded perspective view of the inertia latch mechanism;

FIG. 6 is a side view of the diagonal frame member of the seat back frame containing the seat belt retractor; and FIG. 7 is a sectional view as seen from substantially the line 7—7 of FIG. 6.

DETAILED DESCRIPTION OF THE PREFERRED EMBODIMENT

Figure 3:
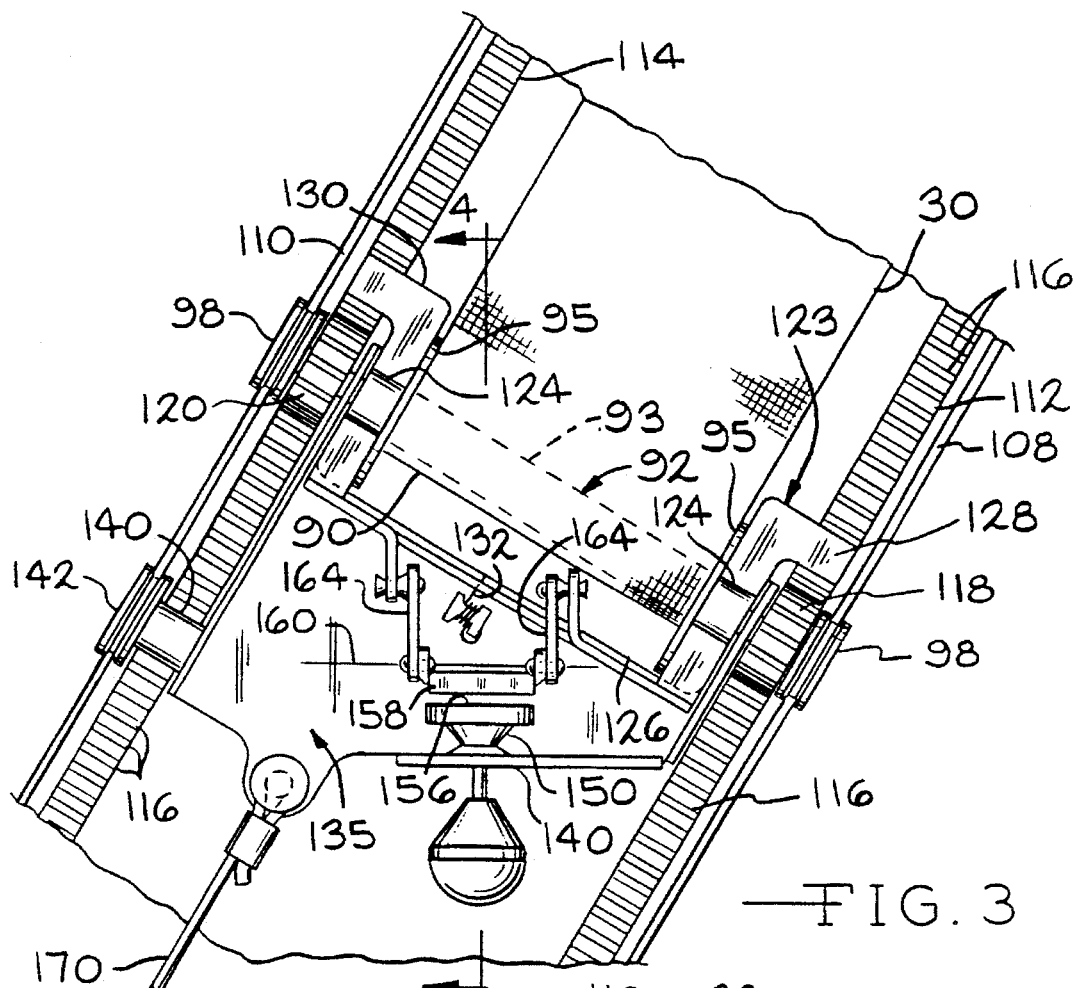
FIG. 3 is a front elevational view of the inertia latch mechanism of the retractor.

Seat 10 shown in FIG. 1 has a seat belt restraint system mounted thereto with the flat seat belt webbing retractor of the present invention. Seat assembly 10 is of a conventional nature having a lower seat cushion 12 with front and rear ends 14 and 16 respectively and an upper seating surface 18. A seat back 20 extends generally upwardly at the rear end of the seat cushion and has a front surface 22 against which the torso of a seat occupant rests. Seat assembly 10 includes a frame beneath the cushion 12 and a frame in the seat back 20 for supporting the foam pads of the seat cushion and seat back, respectively.

The seat 10 includes a passenger restraint system 28 for restraining an occupant in the seat assembly during a vehicle collision. The restraint system includes a seat belt webbing 30 used to form a lap belt and a shoulder belt for the seat occupant. The webbing 30 has a first end 32 that is attached to the seat frame adjacent the rear end of the seat cushion along one side 26 of the seat. The webbing end 32 is attached to the frame through a mounting plate 34 and a seat belt anchor bolt (not shown). When the restraint system is not in use, the webbing 30 extends from the mounting plate 34 upwardly, toward the upper end 36 of the seat back, overlying the front surface 22 of the seat back adjacent the side 26 of the seat assembly. Near the upper end 36 of the seat back, the webbing passes into the seat back through an opening 38 in the seat back upholstery cover.

A seat belt buckle 48 is attached to the seat 10 at the opposite lateral side 50, adjacent the rear end of the seat cushion. The buckle 48 receives a clasp 52 that is slidably mounted to the seat belt webbing 30 between the mounting plate 34 and the location of the opening 38 where the webbing passes into the seat back. To use the restraint system, a seat occupant will grasp the clasp 52 and pull the clasp over his or her body to insert the clasp into the buckle 48. Doing so causes the webbing 30 to extend from the seat back as the webbing forms a lap belt crossing the seat occupant's lap and a shoulder belt extending diagonally across the torso of the seat occupant from the opening 38 in the seat back upholstery to the buckle 48 on the opposite side 50 of the seat assembly.

With reference to FIG. 2, a seat back frame 60 is shown. The frame 60 has a pair of upright members 62 and 64. The upper ends of the upright members are joined together by an upper cross member 66 while the lower ends are joined together by a lower cross member 68. Mounting bosses 70 and 72 extend downwardly from the lower ends of the upright members 62 and 64 and have apertures 74 therein for rotatably mounting the seat back frame 60 to the seat cushion frame (not shown). A diagonal frame member 76 extends from the upper corner 78 of the frame, formed by the juncture of upright member 62 and upper cross member 66, to the opposite lower corner 80, formed by the juncture of the upright member 64 and lower cross member 68. It should be understood that while the frame is described as having various "members", that multiple members may in fact be formed of a single component. For example, the upright member 64 and upper cross member 66 are shown as a single tube which is bent at a right angle forming the upper corner 82. A multitude of configurations can be used to form the seat back frame 60. The seat back frame as shown is only one example and should not be viewed as limiting the scope of the invention.

Figure 4:
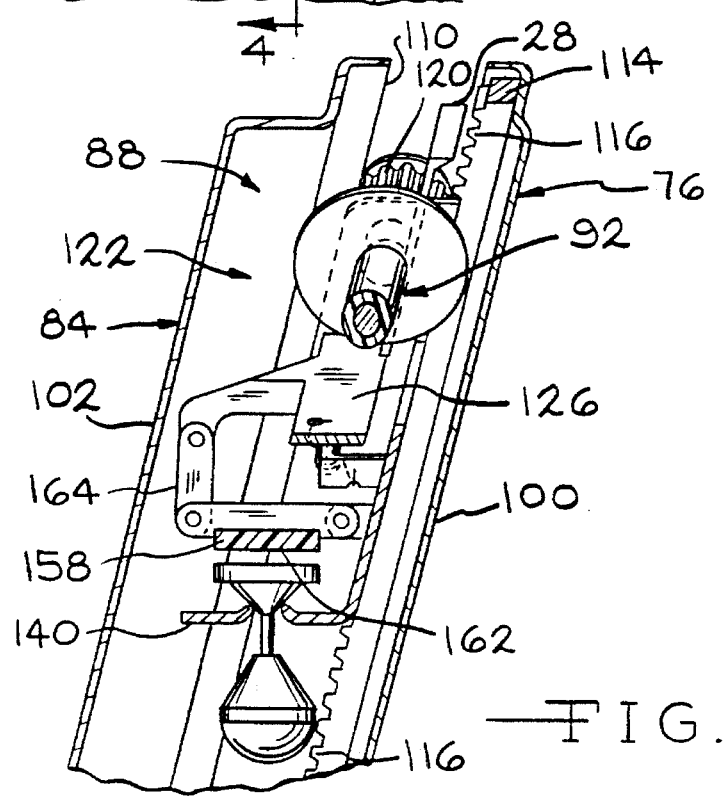
FIG. 4 is a side elevational view of the inertia latch mechanism of FIG. 3.

The diagonal frame member 76 is hollow, forming a housing 84 as shown in FIGS. 4, 6 and 7. An opening 86 into the frame provides access to the hollow interior 88 of the diagonal frame member 76. The seat belt webbing 30, after passing through the opening 38 in the seat back upholstery, passes through the opening 86 into the hollow interior 88 of the housing 84.

The end 90 of the seat belt webbing 30 is disposed within the housing interior 88 and is coupled to a slide 92. Slide 92 is shown in the form of a pin 93 around which the belt webbing is wrapped to couple the webbing into the slide. Each end of the slide 92 has a roller 98 mounted thereon which is rotatable about the slide by a bearing.

The housing 84 is formed of a lower shell 100 and an upper shell 102 which are joined together at the ends of the diagonal frame member 76. The shells are spaced apart along the lateral sides 104 and 106 forming slots 108 and 110 on opposite sides of the housing 84. The rollers 98 on slide 92 are disposed in the slots 108 and 110 and guide movement of the slide lengthwise through the housing 84. As the slide moves through the housing along the length of the slots 108 and 110, the webbing 30 is retracted into the housing when the slide moves away from the opening 86 and is protracted from the housing when the slide moves toward the opening 86.

The rear shell 100 has a pair of elongated gear racks 112 and 114 which extend along the length of the housing adjacent to each of the slots 108 and 110. The gear racks have a plurality of gear teeth 116 which extend transversely of the housing. A pair of gears 118 and 120 are rotatably mounted to the slide 92 immediately inboard of the rollers 98 and engage the racks 112 and 114 respectively. The rollers 98, by being positioned within the slots 108 and 110, hold the slide 92 in place so that the gears 118 and 120 engage the gear racks 112 and 114.

A latch mechanism 122 is mounted to the slide 92 and is used to latch the slide in place to prevent its movement toward the opening 86 in the housing. Latch mechanism 122 includes a pawl 123 with a pair of hubs 124 which include a central bore for mounting the pawl on the slide 92. The hubs 124 are separated from the webbing 30 on the slide 92 by spacers 95. A tie bar 126 connects the two hubs 124 together for simultaneous rotation about the slide 92. The two hubs 124 are positioned adjacent to and inboard of the two gears 118 and 120. Latch levers 128 and 130 extend from the hubs in generally the opposite radial direction from the hubs as the tie bar 126. The levers first extend radially from the hub and then axially outward from the hubs around the gears 118 and 120.

The locking pawl 123 is rotatable between a latch position in which the latching levers 128 and 130 engage the transverse teeth 116 of the gear racks, thus preventing movement of the slide 92 toward the opening 86, and a release position in which the latching levers are spaced from the gear teeth. In the release position, the slide 92 is free to move toward the housing opening 86 and webbing 30 to be protracted from the housing. A spring 132 is provided on the slide 92 for rotationally biasing the latching pawl 123 to the release position in which the slide is free to move.

An inertia latch car 134 is provided which carries a pendulum 136 used to move the latching pawl 123 to the latch position when a predetermined acceleration is experienced. Car 134 is a stamping having a base portion 135 and a pair of upturned flanges 136 and 138 with apertures 139 through which the slide 92 extends. The upturned flanges are disposed inboard of the gears 118 and 120 on the slide 92. A spindle 140 is coupled to the flange 136 and mounts a third roller 142 which is disposed within the slot 110 spaced from roller 98 in slot 110 to provide three points of support for the car 134.

A third upturned flange 140 is angled relative to the car base portion 135 such that it is substantially horizontal relative to the ground when the vehicle is on level ground and the seat back is reclined to a reference position for the seat back within the range of reclined seat back positions. Flange 144 has a detent 146 surrounding an aperture 148. The pendulum 136 has a conical or toroidal shaped head 150 which seats in the aperture 148. A stem 152 extends through the aperture, below the flange 144 and supports a mass 154. The head 150 has a flat upper surface 156 which has a circular periphery.

When the pendulum 136 is exposed to an acceleration, the inertia of the pendulum mass will cause the pendulum to swing from its horizontal position. The swinging of the pendulum will cause one point of the flat upper surface 156 to rise and contact pivot arm 158. The pivot arm 158 is mounted to the car 134 for rotation about the axis 160. The pivot arm extends over the flat upper surface 156 of the pendulum head and has a flat lower contact surface 162 for engagement with the upper surface of the pendulum. The pivot arm is connected by links 164 to the tie bar 126 of the locking pawl 123.

During an acceleration above a predetermined amount, the pendulum 136 will swing, raising the pendulum upper surface 156 into contact with the pivoting arm 158. This contact will raise the pivoting arm 158 with sufficient lifting force to overcome the biasing spring 132 on the latching pawl. The pawl is thus rotated into the latch position, engaging the locking levers 128 with the rack teeth. When this occurs, movement of the slide toward the opening 86 is prevented and protraction of the webbing from the housing 84 is prevented.

A spring housing 168 is attached to the housing 84 at the end of the housing opposite from the opening 86. A tape spring 170 is wound within the housing 168 and has one end extending therefrom and connected to the car 134. The spring pulls the car and slide 92 away from the opening 86 so that there is a force on the webbing to retract the webbing into the housing. When the clasp 52 is released from the buckle 48, the spring 170 will pull the slide away from the opening 86 and retract a portion of the belt webbing into the housing 84. The spring 170 will also maintain the webbing 30 against the chest of the seat occupant to avoid a slack webbing condition in which the webbing is loose across the occupant's chest. However, the force in spring 170 is not so great as to prevent the occupant from moving comfortably within the seat to reach various vehicle controls, etc. Once the occupant leans back in the seat, the spring 170 will retract the webbing 30 to a comfortable position across the occupant's chest.

The retractor of the present invention provides more convenient packaging of a seat belt webbing retractor within the seat back of a vehicle seat. This is accomplished by maintaining the webbing in a substantially flat position as opposed to coiling the webbing around a spool which results in considerable bulk to the retractor. Furthermore, by incorporating the webbing into an already existing structural component of the seat back frame, fewer additional components are added to the seat back to provide a seat mounted retractor.

It is to be understood that the invention is not limited to the exact construction illustrated and described above but that various changes and modifications may be made without departing from the spirit and scope of the invention as defined in the following claims.

We claim:

1. A seat for a motor vehicle having a generally horizontal seat cushion and a generally upright seat back comprising:

a plurality of elongated load carrying frame members arranged and joined together to form a generally planar support frame for said seat back for carrying seating loads, said support fame having a pair of upper corners and a pair of lower corners, one of said elongated frame members defining an elongated housing having a hollow interior and having an opening into said hollow interior;

an elongated belt webbing partially disposed within said housing and extending from said housing through said opening;

a slide movable in said housing for movement along a predetermined lengthwise path in said housing toward and away from said opening, said webbing being connected to said slide for movement of said webbing along with said slide for retraction of a portion of said webbing into said housing when said slide is moved away from said opening and for protraction of a portion of said webbing from said housing when said slide is moved toward said opening; and retractor means disposed in said housing and Connected to said slide for biasing said slide away from said opening to retract said webbing into said housing, said retractor means enabling said webbing to be partially removed from said housing for use of said webbing by pulling on said webbing whereby said slide is moved toward said opening.

2. The seat of claim 1 wherein said frame member defining said housing extends diagonally of said frame between one upper corner and an opposite lower corner with said opening being located adjacent said one upper corner.

3. The seat of claim 2 further comprising inertia latch means within said housing and coupled to said slide for locking said slide in place to prevent movement of said slide toward said opening and protraction of webbing from said housing when said seat experiences an acceleration above a predetermined amount.

4. The retractor of claim 3 wherein said inertia means comprises:

at least one rack mounted to said housing and extending lengthwise of said housing With a plurality of teeth extending transversely of said housing;

a locking pawl rotatably carried by said slide and having a latch lever extending from said slide in a direction toward said opening, said locking pawl being rotatable between a latch position in which said latch lever engages said rack teeth to prevent movement of said slide toward said opening and a release position spaced from said rack teeth enabling movement of said slide toward said opening; and a pendulum having a mass supported on a stem depending from a head and resting in a normally vertical position and being movable to an inclined position in response to an acceleration by inertia of said pendulum and means connecting said pendulum to said locking pawl for rotating said locking pawl to said latch position when said pendulum moves a predetermined angular distance from said vertical resting position.

5. A seat for a motor vehicle having a generally horizontal seat cushion and a generally upright seat back comprising:

a plurality of elongated load carrying frame members arranged and joined together to form a generally planar support frame for said seat back for carrying seating loads, said support fame having a pair of upper corners and a pair of lower corners, one of said elongated frame members defining a housing having a hollow interior and having an opening into said hollow interior;

an elongated belt webbing partially disposed within said housing and extending from said housing through said opening;

a slide movable in said housing;

guide means coupled to said slide and said housing for guiding the movement of said slide along a predetermined lengthwise path in said housing toward and away from said opening;

means for coupling said webbing within said housing to said slide for movement of said webbing along with said slide for retraction of a portion of said webbing into said housing when said slide is moved away from said opening and for protraction of a portion of said webbing from said housing when said slide is moved toward said opening; and biasing means coupled to said slide and said housing for urging said slide away from said opening to retract said webbing into said housing.

6. The seat of claim 5 wherein said frame member defining said housing extends diagonally of said frame between one upper corner and an opposite lower corner with said opening being located adjacent said one upper corner.

7. The seat of claim 5 further comprising:

latch means for locking said slide in place to prevent movement of said slide toward said opening and protraction of webbing from said housing, said latch means having a latch position in which said slide is prevented from movement toward said opening and a release position in which said slide is free to move toward said opening;

latch bias means for urging said latch means to said release position; and inertia means for moving said latch means to said latch position when a predetermined acceleration is experienced by said inertia means.

8. The retractor of claim 7 wherein said latch means comprises:

at least one rack mounted to said housing and extending lengthwise of said housing with a plurality of teeth extending transversely of said housing; and a locking pawl rotatably carried by said slide and having a latch lever extending from said slide in a direction generally toward said housing opening, said locking pawl being rotatable between a latch position in which said latch lever engages said rack teeth to prevent movement of said slide toward said opening and a release position spaced from said rack teeth enabling movement of said slide toward said opening.

9. The retractor of claim 8 wherein said inertia means includes a pendulum having a mass supported on a stem depending from a head and resting in a normally vertical position and being movable to an inclined position in response to an acceleration by inertia of said pendulum and means connecting said pendulum to said locking pawl for rotating said locking pawl to said latch position when said pendulum moves a predetermined angular distance from said vertical resting position.

10. The retractor of claim 5 wherein said webbing has an end disposed in said housing and said webbing end is coupled to said slide.

11. A frame for a vehicle seat back comprising:

a pair of spaced upright members each having lower ends and upper ends, said lower ends being adapted to be mounted to a lower seat frame;

a cross member coupled to and extending between said upper ends of said upright members forming an inverted U-shaped frame;

a diagonal member coupled to and extending between the upper end of one of said upright members and the lower end of the opposite upright member, said diagonal member having a hollow interior forming a housing, said frame having an opening near the upper end of said one upright member into said housing;

a slide movable in said housing along a predetermined lengthwise path toward and away from said opening; and an elongated belt webbing partially disposed within said housing and extending from said housing through said opening, said belt webbing being coupled to said slide for movement of said webbing along with said slide for retraction of a portion of said webbing into said housing when said slide is moved away from said opening and for protraction of a portion of said webbing from said housing when said slide is moved toward said opening.

12. The seat of claim 11 further comprising means for urging said slide away from said opening to retract said webbing into said housing.

13. The seat of claim 12 further comprising:

latch means for locking said slide in place to prevent movement of said slide toward said opening and protraction of webbing from said housing, said latch means having a latch position in which said slide is prevented from movement toward said opening and a release position in which said slide is free to move toward said opening;

bias means for urging said latch means to said release position; and inertia means for moving said latch means to said latch position when a predetermined deceleration is experienced by said inertia means.

14. The retractor of claim 13 wherein said latch means comprises:

at least one rack mounted to said housing and extending lengthwise of said housing with a plurality of teeth extending transversely of said housing;

a locking pawl rotatably carried by said slide and having a latch lever extending from said slide in a direction toward said opening, said locking pawl being rotatable between a latch position in which said latch lever engages said rack teeth to prevent movement of said slide toward said opening and a release position spaced from said rack teeth enabling movement of said slide toward said opening.

15. The retractor of claim 14 wherein said inertia means includes a pendulum having a mass supported on a stem depending from a head and resting in a normally vertical position and being movable to an inclined position by inertia of said pendulum and means connecting said pendulum to said locking pawl for rotating said locking pawl to said latch position when said pendulum moves a predetermined angular distance from said vertical resting position.

16. The retractor of claim 15 wherein said bias means urges said locking pawl to said release position.

* * * * *